Patented Jan. 4, 1944

2,338,376

UNITED STATES PATENT OFFICE 2,338,376

SEPARATING THE COCOA SEED FROM THE COCOA BEAN

Josef Drenker, Cologne, Germany; vested in the Alien Property Custodian

No Drawing. Application May 19, 1941, Serial No. 394,227. In Germany March 11, 1939

2 Claims. (Cl. 209—173)

This invention relates to separating the cocoa seed from the cocoa bean.

Attempts have heretofore been made to separate the seeds of the cocoa bean material, but these have not been entirely satisfactory, and the object of this invention is to provide a method for such separation, whereby a substantially total separation can be accomplished by relatively simple means.

The invention consists in the method of separating cocoa bean material particles from uncleaned or partially cleaned cocoa seeds and recovering the cocoa bean material, which consists in subjecting a mixture of both cocoa bean material and cocoa seeds to the action of a salt solution, in the proportion of 3:10, whereby due to the relative specific gravity and relative viscosity, the cocoa bean seeds settle to the bottom of the bath, the cocoa bean material or particles segregating on the surface of the solution, and then washing said cocoa bean particles or material thus segregated from the seeds, and then drying such material. The salt is preferably cooking salt, that is sodium chloride, not necessarily chemically pure, nor refined, to avoid the higher cost of the same.

The invention will be more carefully described hereinafter, with the aid of an example, and will be finally pointed out in the claims.

A cooking salt aqueous solution in the proportion of 3 parts of cooking salt, and ten parts water is prepared. The mixture of uncleaned or partly cleaned cocoa seeds and cocoa bean particles are dropped or injected in this solution, and gently stirred, if desired, and after a short time a separation will take place, the seeds descending to the bottom of the bath, and the desired recovery of the cocoa bean material ascending, and segregating on the surface of the bath. A sieve or similar utensil can be used to drain off the solution from the recovered cocoa material or from the cocoa particles free from the seeds.

These recovered cocoa bean particles are then washed in clean water, and dried, and can then be used in the same manner as standard cocoa beans. The seeds are recovered by draining off the salt solution and collecting the deposits, and then washing in clean water and drying them.

The relative specific gravity and the surface tension of the seeds and particles and the viscosity of the bath in relation to the seeds on the one hand and the cocoa bean material or particles on the other hand, being about this ready separation as described.

An example, by way of illustration, is herewith given:

A mixture of 500 kg. of cocoa seeds and cocoa bean material, in which about 40–42% of bean particles and 59–60% of real cocoa seeds are present, was subjected to the action of a bath in the form of a cooking salt solution of 3:10. A separation of this mixture automatically took place within a short time, about three minutes, the time being shorter when the mixture is first gently stirred for a brief period to enable the solution to contact quicker with the surfaces of the ingredients of the mixture. The cocoa bean material gathered on the surface of the bath, whereas the seeds descended to the bottom of the container. When the separation was completed as far as the ordinary observing of the eye could tell, then the surface accumulations were removed by a sieve and washed clean by clear water and dried. The seeds were separated from the bath solution, washed and dried. Through this simple method 205 kg. cocoa beans material and 285 kg. cocoa seeds, the latter substantially entirely free from bean material, were obtained.

This method is a distinct improvement over and differs from the prior art in this:

It is a known fact that when cleaning the roasted opened cocoa beans, it was found aside from the shells and other waste also some cocoa seeds which, however, are mixed with parts of the cocoa beans. Generally, they are separated by a degerminating-machine. The separation is, however, not complete. Even after having gone through the degerminating-machine various times, the seeds are still mixed with quite a percentage of cocoa bean particles which are similar in form and size to these seeds and consequently cannot pass the sieve. A complete segregation of the cocoa bean particles by passing through sieves seemed therefore practically impossible.

The degermination machines which were necessary until now are thereby not needed any longer. Depending on the quantity of cocoa mixture (cocoa seeds and cocoa bean particles) the degerminating machine could be still used as a preliminary and coarser separation. With this new process however, it is possible to obtain the segregation of the cocoa bean particles from the mixture in a manner and to an efficiency which was up till now not possible.

One can of course vary somewhat the proportion of 3 to 10 and this solution is used, generally, at room temperature. The amount of mixture added to the salt solution is such as to enable a facile separation to take place, that is, there must always be more liquid contents than mixture contents.

I have explained the invention to enable anyone skilled in the art to understand the same, but variations may be made, as a slight change in the salt solution without departing from the spirit of the invention as defined in the appended claims.

I claim:

1. The method of recovering cocoa bean particles from cocoa seeds, which consists in soaking a dried roasted mixture of cocoa seeds and cocoa bean particles in a solution of three parts of sodium chloride in ten parts of water until the seeds sink, removing the bean particles and rinsing the salt solution out of the said particles and drying the same.

2. The method of recovering cocoa bean particles from cocoa seeds, which consists in soaking a dried roasted mixture of cocoa seeds and cocoa bean particles in a salt solution inert to the oil in the bean particles until the seeds sink, removing the bean particles and rinsing the salt solution out of the said particles and drying the same.

JOSEF DRENKER.